US005677498A

United States Patent [19]
Oakes et al.

[11] Patent Number: 5,677,498
[45] Date of Patent: Oct. 14, 1997

[54] VEHICLE AXLE LOAD WEIGHING SYSTEM

[75] Inventors: Bryan R. Oakes, Redmond; Peter N. Nguyen, Renton, both of Wash.

[73] Assignee: Structural Instrumentation, Inc., Tukwila, Wash.

[21] Appl. No.: 693,802

[22] Filed: Aug. 1, 1996

[51] Int. Cl.[6] ............................................. G02L 1/00
[52] U.S. Cl. ........................... 73/862.541; 177/136
[58] Field of Search ................. 73/862.541, 862.631, 73/862.632, 862.635, 862.642; 177/136, 139

[56] References Cited

U.S. PATENT DOCUMENTS

| | | |
|---|---|---|
| 2,923,540 | 2/1960 | Yost et al. . |
| 3,661,220 | 5/1972 | Harris . |
| 3,857,452 | 12/1974 | Hartman . |
| 3,990,032 | 11/1976 | Fish et al. . |
| 4,042,049 | 8/1977 | Reichow et al. . |
| 4,505,344 | 3/1985 | Hobbs et al. ............................... 177/136 |
| 4,638,876 | 1/1987 | Balduin et al. . |
| 4,662,217 | 5/1987 | Hafner ............................. 73/862.042 X |
| 4,771,837 | 9/1988 | Appleton et al. . |
| 4,832,141 | 5/1989 | Perini et al. . |
| 5,086,656 | 2/1992 | Schwendemann et al. ........ 73/12.01 X |
| 5,178,226 | 1/1993 | Bowman et al. . |
| 5,291,795 | 3/1994 | Hafner ............................. 73/862.041 X |
| 5,366,033 | 11/1994 | Koivisto ................................... 177/136 |
| 5,410,109 | 4/1995 | Tarter et al. ............................. 177/136 |
| 5,478,974 | 12/1995 | O'dea ................................. 177/136 X |
| 5,501,111 | 3/1996 | Sonderegger et al. ............. 73/862.642 |
| B1 4,839,835 | 1/1994 | Hagenbuch . |

FOREIGN PATENT DOCUMENTS

2413067  10/1974  Germany .

Primary Examiner—Elizabeth L. Dougherty
Attorney, Agent, or Firm—Christensen O'Connor Johnson & Kindness PLLC

[57] ABSTRACT

A system for determining the load on each axle of a vehicle (150) uses load cells (130, 140) mounted on the bed of the vehicle (150) at load-bearing locations that are longitudinally spaced apart from the axles. Axle weight for each axle is determined from the load cell output signals based upon the moments about the effective longitudinal center point of each axle assembly, and the load-bearing points at which the load cells are mounted. System calibration is effected by using load cell signals when the vehicle (150) is unloaded and load cell signals when the vehicle (150) is loaded.

16 Claims, 3 Drawing Sheets

VEHICLE AXLE LOAD WEIGHING SYSTEM

FIELD OF THE INVENTION

The present invention relates to systems for measuring the load carried by tilt-bed vehicles and, more particularly, to measuring systems having weight sensing elements mounted on vehicle load carrying members to determine the load carried by the vehicle.

BACKGROUND OF THE INVENTION

Weight regulations limiting the loading weights of commercial vehicles are almost universally in effect. These regulations generally specify the maximum load that may be carried on each vehicle axle as well as the maximum total load carried by the vehicle. Fines are usually levied against operators who are found violating these regulations.

To maximize profits and efficiency, vehicle operators normally load their vehicles close to the legal load limits. In order to do so, the vehicle operator must be able to accurately measure the vehicle's weight either during loading or after the vehicle is loaded.

One device commonly used to determine the weight of loaded vehicles is the platform scale. An operator drives his vehicle onto a platform, and the weight of the vehicle and its load, known as the gross weight, is measured. The weight of the load is then determined by subtracting the weight of the unloaded vehicle, known as the tare weight, from the measured weight value. Typically, the weight on each axle of the vehicle is determined by positioning the vehicle so that only the axle of which the weight is to be measured rests on the platform.

A disadvantage of platform scales is their frequent unavailability when the vehicle is being loaded. Platform scales are generally installed at fixed installations due to their size and weight. When the vehicle is not resting on the platform during loading, the operator must estimate the load placed on the vehicle. Only after the vehicle has been driven from the loading area to the weighing area does the operator learn the weight of his load. If the operator's estimate was too low, the vehicle is returned to the loading area, and part of the load removed. If the estimate is too high, the vehicle is either returned to the loading area to add additional load or the vehicle is driven with a load below the maximum allowed load, thus possibly reducing operational profits.

The aforementioned disadvantages of platform scales have been reduced somewhat by using portable platform scales that can be placed under each set of wheels. Such platform scales are carried from place to place in the vehicle. However, such scales are generally fairly expensive. Further, it is time consuming to place these scales beneath the individual sets of wheels and move the vehicle onto the scales in order to measure axle weights.

To reduce the aforementioned problems, onboard vehicle weighing systems have been developed. In these systems, load cells or other weight-sensing transducers are secured to structural members of the vehicle in order to obtain axle weights.

However, these systems also have shortcomings. For example, in prior onboard weighing systems in order to obtain axle weights, the load cells are mounted so that the load cells bear the weight carried by a particular axle. The requirement to locate the load cells at such locations makes it difficult to adapt load systems to many vehicles. In some vehicles, structural limitations restrict the possible mounting locations for the load cells. Thus, in such applications, it is generally not possible to place the load cells on the vehicle in a manner such that the load placed on the load cells closely corresponds to the load placed on the vehicle's axles.

For example, it is generally not possible to locate load cells on dumptrucks or other types of lift vehicles such that the load cells reflect the load carried by the individual axles of the vehicle. In such applications, the load cells are generally mounted beneath the vehicle bed at the pivotal connection between the frame of the vehicle and the front of the vehicle bed and at a position between the frame of the vehicle and the rear portion of the vehicle bed. This configuration allows the load cells to be used in determining the total weight carried within the bed of a dumptruck or other tilt-type vehicle. However, such placement of the load cells does not correspond to the axles of the vehicle. Therefore, the load exerted on the load cells does not correspond to the load placed on the individual axles of the vehicle.

Accordingly, there exists a need for improved methods of determining axle weights of load-carrying vehicles. The present invention is directed toward fulfilling this need.

SUMMARY OF THE INVENTION

The present invention provides an onboard load measuring system that accurately determines the load placed on each axle system of a multiple-axle vehicle. In one embodiment, the vehicle incorporating the invention is of a type having a pivotally mounted load-bearing platform positioned above a vehicle frame, the load-bearing platform connected to the vehicle frame at two or more support/pivot points. One end of the platform can be raised and lowered, while the other end pivots at a pivot point. A typical vehicle that may incorporate the invention is a dumptruck having a single axle assembly near the front of the vehicle, and an axle assembly consisting of a tandem axle suspension system near the rear of the vehicle. The tandem axle suspension system typically includes fore and aft axles, each having pairs of wheels mounted on opposite ends thereof.

The invention includes a plurality of weight sensors mounted at load-bearing points of a load-bearing platform, or bed of the vehicle. The currently preferred embodiment of the invention includes two pair of weight sensors with the two sensors of each pair of sensors being positioned such that they are at approximately the same longitudinal position relative to the vehicle. Typically, the forward pair of weight sensors is positioned between the forward axle assembly and the aft tandem axle suspension system, and the aft pair of sensors is positioned to the rear of the tandem axle suspension system, though other configurations are possible. The weight sensors are positioned such that, in combination, they measure the total load placed upon the vehicle.

The load placed upon each axle assembly is determined based upon the equilibrium of moments, or torque, about each axle assembly and each sensor location. In that regard, the counterclockwise moment exerted at a load-bearing location of the forward sensor pair about the aft axle system is equal to the force (weight) placed on the forward sensor pair multiplied by the distance between the forward sensor pair and the effective center of the aft axle system. A similar calculation derives a clockwise moment exerted at the load-bearing location of rear sensor pair about the effective center of the aft axle system. An upward force exerted by the forward axle assembly (support by the wheels) creates a clockwise moment about the aft axle system, equal to the load upon the forward axle assembly multiplied by the distance between the effective center of the forward axle system and the effective center of the aft axle system. Since the three above-described moments are in equilibrium, balancing the counterclockwise moment against the clockwise moments allows the unknown moment exerted at the forward axle assembly to be derived, in turn, allowing the unknown force (weight of vehicle and load) exerted at the forward axle assembly to be determined. Similar steps are taken to determine the unknown force (weight of vehicle and load) exerted at the aft axle system.

The currently preferred embodiments of the invention employ weight sensors that supply an output signal linearly related to the weight applied to the sensor. Thus, the actual weight applied to a sensor pair can be expressed as a constant value m multiplied by the sensor output signal plus an offset value b. To calibrate the system, readings are taken from the sensors when the vehicle is empty, with the weight upon the axles being measured using a platform-type scale. Using the load-bearing mounting location of the rear sensor pair as the fulcrum, the equilibrium of the clockwise moments exerted at the forward axle assembly and at the aft axle system are balanced against the counterclockwise moment exerted at the forward sensor pair. The balance allows the unknown weight at the forward sensor pair to be determined. The process is repeated when the vehicle is loaded (preferably at full load). Having actual weights at the forward sensor pair corresponding to two different output signals, the linear relationship between the actual weight and the output signal is user to derive the constant slope m and the offset b corresponding to the forward sense pair. A similar process is used to derive the slope and offset corresponding to the aft sensor pair.

Having the slope m and base offset b for each sensor pair, the above-described method is used to determine the load borne by each axle assembly using output signals provided by the sensors and the longitudinal distances between the effective centers of the axle assemblies and the longitudinal distances between the sensors and the effective centers of the axle assemblies (each of which is known as predetermined and remains constant for a particular vehicle installation.

The invention includes an onboard computer electronically connected to the weight sensors. At the time of calibration, an operator enters the relevant longitudinal distances, as discussed above, and the actual loads upon the axle as measured by the platform scale. The weight sensors transmit output signals to the onboard computer, which performs the necessary calculations and stores the data in memory. With system calibrated, the onboard computer receives signals from the weight sensors, and determines the load on each axle assembly using the method described above with the weight information being displayed to the operator.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
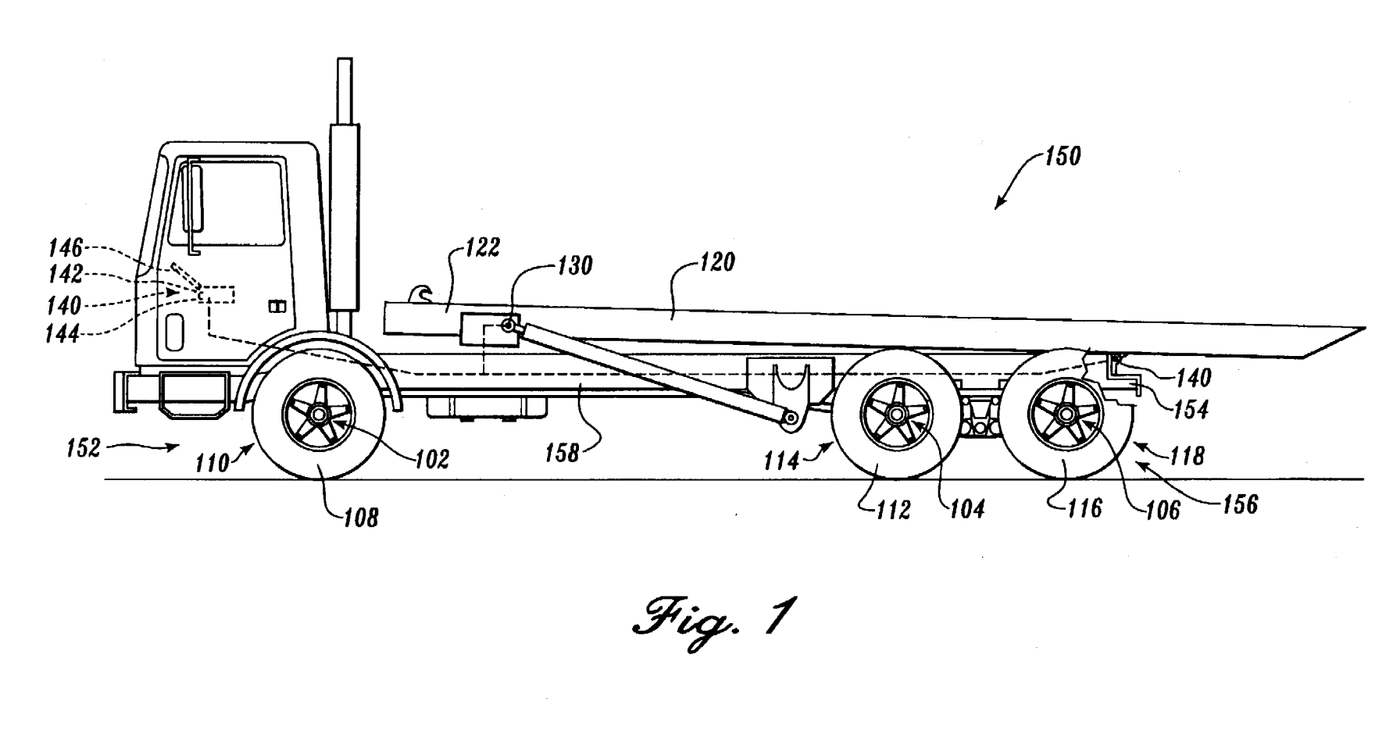
FIG. 1 is a side elevational view showing a multiple-axle vehicle on which an embodiment of a weighing system according to the present invention is installed.

The preferred embodiment of an onboard vehicle axle load measuring system according to the present invention is shown in FIG. 1. The load measuring system is installed on an exemplary vehicle 150 having a single axle assembly 102 near the front 152 of the vehicle and a tandem-axle suspension system 156 near the rear 154 of the vehicle. The tandem axle suspension system 156 includes fore and aft axles 104 and 106. Wheels are mounted at each side of the axles 104 and 106 with wheels 112 and 116 being shown in the side elevation view of FIG. 1.

Figure 2:
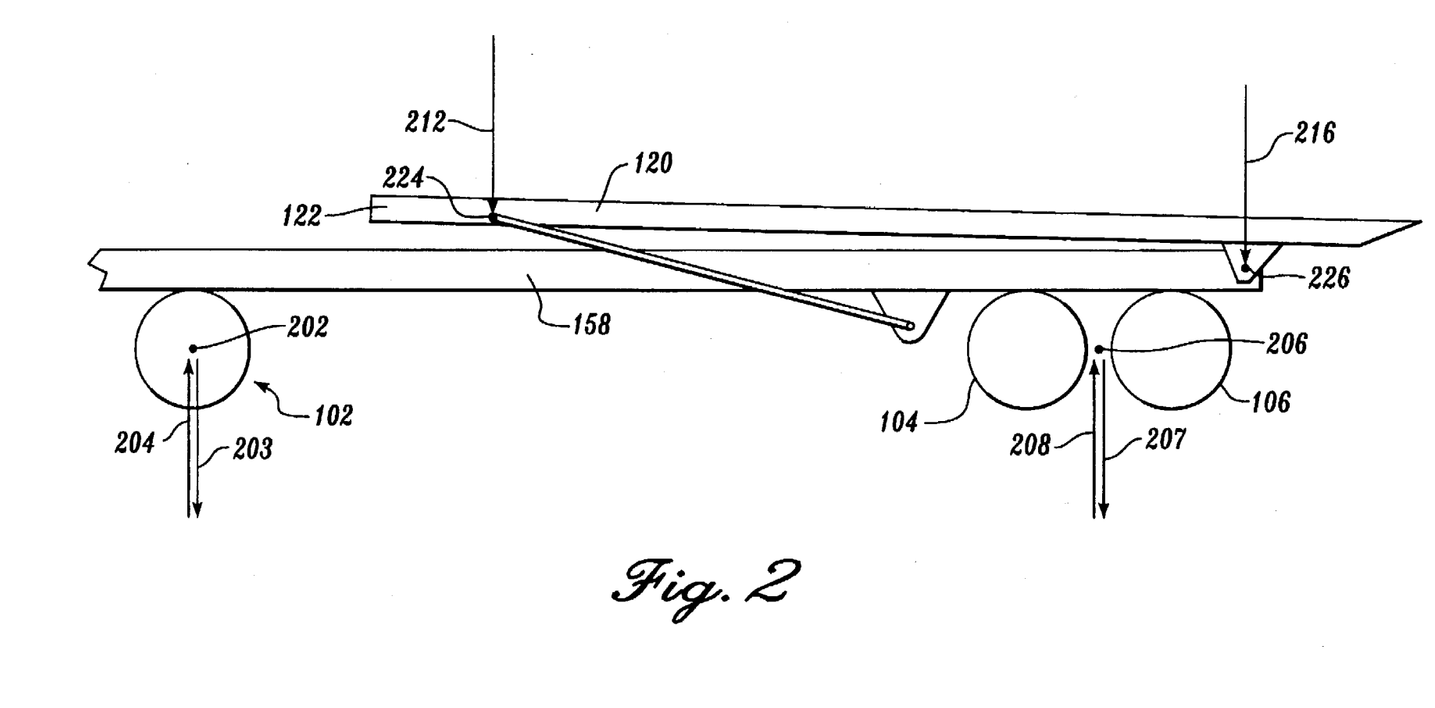
FIG. 2 is a side elevational view, schematically showing the relative longitudinal positions of the weight sensing elements and the vehicle axles.

Shown in FIG. 2, in schematic form are the relevant points of the vehicle that bear the weight of the vehicle and its load and, in addition, the vertical forces exerted at these points. A downward force exerted at the axle of axle assembly 102 is represented by a downward arrow 203 emanating from the point 202 representing the center of the front axle assembly 102. Counterbalancing this downward force 203 is an upward force 204 exerted by the axle on the load at the point 202. A downward force 207 exerted at a point 206 midway between the rear axles 104 and 106 is counterbalanced by an upward force 208 exerted by the rear axle system at the point 206. When the invention is used with vehicles having a single rear axle, point 206 is at the location of the rear axle. Thus, as used herein, the term rear axle point 206 refers to a point midway between the axles of a tandem rear axle vehicle, and to the location of the rear axle for a single rear axle vehicle. When the invention is used with a single rear axle vehicle, the axle weights are determined in a similar manner to that described below with respect to the depicted tandem axle vehicle.

As is indicated in FIG. 1, two sets of weight sensors 130, 140 are mounted between the vehicle frame 158 and the load-carrying portion, or bed 120, of the vehicle 150. The weight sensors 130 and 140 can be pin-type load cells, shear or bending-beam-type load cells, or other sensing elements capable of measuring applied loads. Preferably, each set of weight sensors consists of a pair of weight sensors, the sensor of each pair being located at corresponding locations on each side of the vehicle 150. Upon understanding the invention, it will be recognized that a set of weight sensors may consist of several similarly positioned sensors.

In the preferred embodiment, shear-pin-type load cells are used as the rear weight sensors 140 while shear-beam-type load cells are used as the forward weight sensors 130. As is indicated in FIGS. 1 and 2, the bed 120 of the vehicle 150 is capable of being lifted at the forward end 122 and is rotationally supported at a pivot point 224 proximate the forward end of bed 120 and at a pivot point 226 near the rear of bed 120. In the most preferred embodiment, the weight sensors 130 and 140 are located at the pivot points 224 and 226. When the forward end 122 of the vehicle bed 120 is slightly elevated, the total weight of the load placed upon the vehicle bed 120 rests upon the two pairs of weight sensors 130, 140. Generally, an elevation of about 12 inches is sufficient for obtaining a weight measurement for front axle assembly 102 by and the tandem-axle system 156. By summing the two weight measurements, total weight (vehicle and its load) can be obtained.

In FIG. 2, one of the forward weight sensors of the forward pair of weight sensors 130 is represented by the point 224. The load exerted upon the forward weight sensor 130 is represented by the downward arrow 212. Similarly, one of the rear pair of weight sensors 140 is represented by the point 226 in FIG. 2. The load exerted upon the rear sensor 140 at the point 226 is represented by the downward arrow 216.

The present invention uses signal information provided by the forward and aft weight sensors 130 and 140 combined with geometrical data that represents the horizontal distances between the sensors and vehicle's axles to determine axle weights. Thus, in order to determine the weight applied to each axle, the locations of the forward and aft sensors and axles must first determined or established.

Figure 3:
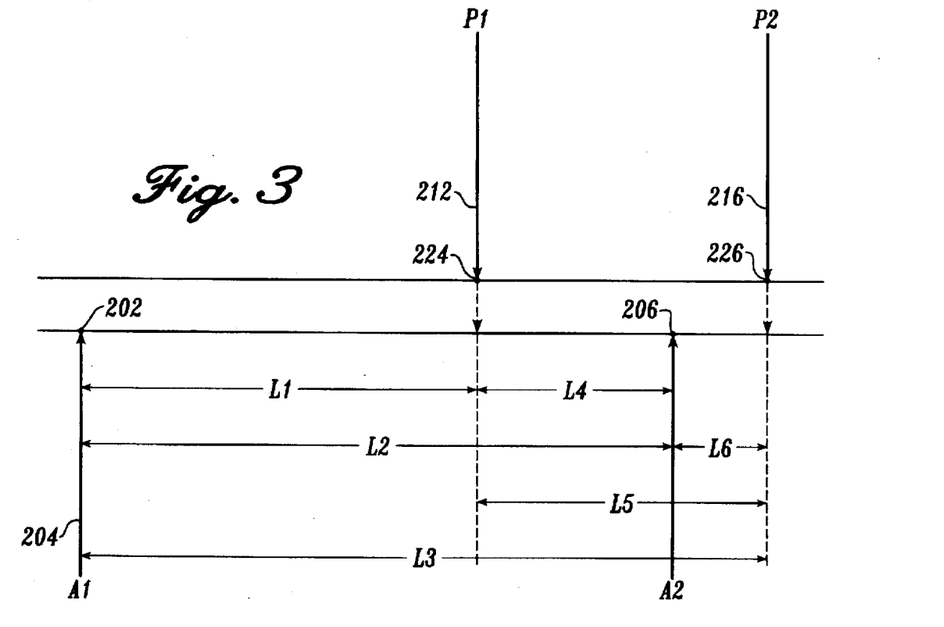
FIG. 3 is a schematic diagram showing the points at which forces are exerted upon the weight sensing elements and the vehicle axles.

FIG. 3 shows the longitudinal points of interest and the distances between them. Specifically, the points representing the forward sensor point 224 and the rear sensor point 226 are shown. The points representing the forward axle point 202 and the rear axle point 206 are also shown. Table 1 lists six relevant longitudinal distances, labeled L1 to L6, and the end points corresponding to each longitudinal distance.

TABLE 1

| Distance | Forward Reference | Rear Reference |
| --- | --- | --- |
| L1 | Forward axle point (202) | Forward sensor point (224) |
| L2 | Forward axle point (202) | Rear axle point (206) |
| L3 | Forward axle point (202) | Rear sensor point (226) |
| L4 | Forward sensor point (224) | Rear axle point (206) |
| L5 | Forward sensor point (224) | Rear sensor point (226) |
| L6 | Rear axle point (206) | Rear sensor point (226) |

Note that the distance L6 between the rear axle point 206 and the rear sensor point 226 can be measured directly or can be derived from the measured distances L2 and L3, by subtracting L2 from L3. Similarly, the distance L5 can be derived by subtracting L1 from L3, and the distance L4 308 can be derived by subtracting L6 from L5.

Figure 4A:
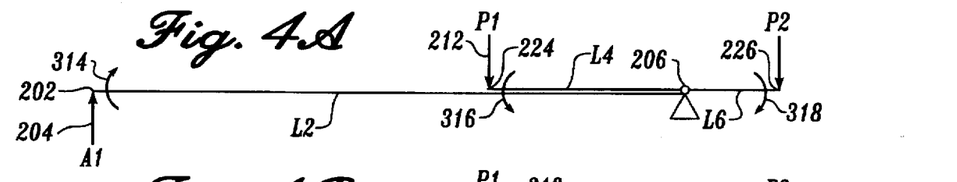
FIGS. 4A to 4D are schematic diagrams illustrating the moments produced by the forces of FIG. 3.

The upward force indicated by arrow 204 exerted at the forward axle point 202 can be determined in terms of the downward force 212 at the forward sensor point 224, the downward force 216 at the rear sensor point 226, the longitudinal distance L4 between the forward sensor point 224 and the rear axle point 206, and the longitudinal distance L6 between the rear sensor point 226 and the rear axle point 206, as follows. A counterclockwise moment 316 or torque, indicated in FIG. 4A, is exerted about the rear axle point 206 by the downward force 212, with the magnitude of the moment being equal to the downward force 212 at the forward sensor point 224 (P1) multiplied by the longitudinal distance L4. A counteracting clockwise moment 318 of magnitude equal to P2 multiplied by the distance L6 is exerted by the downward force 216 (P2) that acts upon rear sensor point 226. In addition, the force 204, which acts upwardly upon forward axle point 202, asserts a clockwise moment 314 about rear axle point 206 that is equal to A1 multiplied by the distance L2 between the forward axle point 202 and the rear axle point 206.

With the bed 120 of the vehicle elevated, but motionless, the sum of the moments about rear axle point 206 is necessarily equal to zero. Thus:

$$A1*L2=(P1*L4)-(P2*L6) \quad (1)$$

where, by convention, clockwise moment is positive.

Figure 4B:
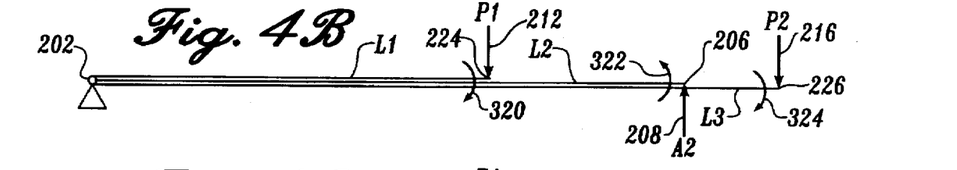

The moments about the forward axle point 202 can be determined in a similar manner. Specifically, as is indicated in FIG. 4B, a clockwise moment 320 is exerted by the downward force 212 (P1), which acts upon the forward sensor point 224, multiplied by the longitudinal distance L1. The upward force 208 (identified on FIG. 4B as A2), which acts upon rear axle point 206, asserts a counteracting counterclockwise moment 322 about forward axle point 202, with the magnitude of moment 322 being equal to A2 multiplied by the distance L2. In addition, a clockwise moment 324 is exerted by the downward force 216 (P2), with moment 324 being equal to P2 multiplied by the distance L3. Balancing the clockwise moments 320 and 324 against the counterclockwise moment 322 yields:

$$A2*L2=(P1*L1)+(P2*L3) \quad (2)$$

Note that, in alternative embodiments the sensors can be positioned so that the forward sensor point 224 is not intermediate the forward axle point 202 and the rear axle point 206. Instead, the forward axle point 202 can be located between the forward sensor point 224 and the rear axle point 206. In such an arrangement, the downward force 212 exerted at the forward sensor point 224 establishes a counterclockwise moment about the forward axle point 202, rather than a clockwise moment. Balancing forces in such a case yields:

$$A2*L2=(P2*L3)-(P1*L1) \quad (3)$$

Figure 4C:
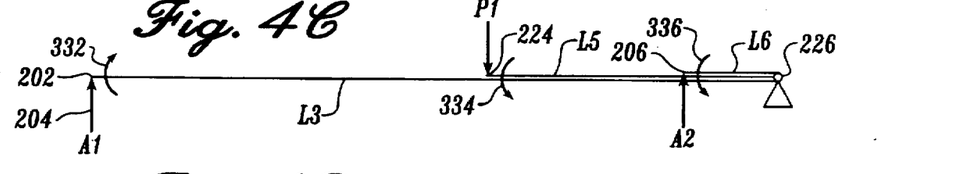
Figure 4D:
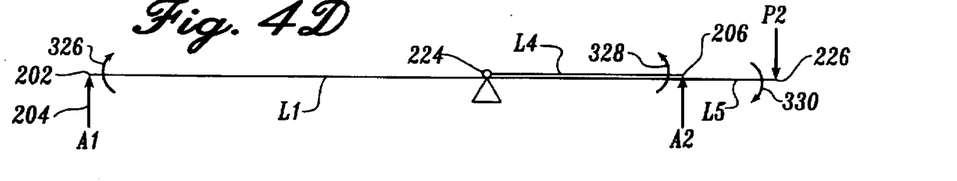

Returning to the preferred embodiment, the moments about the point 226 of the rear sensor 140 and the point 224 of the forward sensor 130 are indicated in FIGS. 4C and 4D, respectively, and, when balanced to provide a net zero moment yield:

$$P1*L5=(A2*L6)+(A1*L3) \quad (4)$$

$$P2*L5=(A2*L4)-(A1*L1) \quad (5)$$

In the alternate configuration described with respect to equation (3) above, the moment about the forward sensor point 224 exerted by the upward force 204 (A1) at the forward axle 202 is clockwise rather than counterclockwise, thus resulting in:

$$P1*L2=(A2*L4)+(A1*L1) \quad (6)$$

Currently available sensors, such as the previously mentioned pin-type and shear beam-type load cells, supply an output signal that is linearly related to the weight applied to the sensor. Thus, when such sensors are used in the invention the forces P1 and P2 can be expressed as:

$$P1=m1*S1+b1 \quad (7)$$

and $$P2=m2S2+b2 \quad (8)$$

where: m1 and m2 are the respective slopes of the straight line relationships between the weight borne by the sensors (forward sensors 130 and rear sensors 140 in FIG. 1) and the associated sensor output signals S1 and S2; and b1 and b2 are offset values that are respectively equal to the signals produced by the respective sensors when no weight is applied. Thus, when the vehicle is not loaded, the forces asserted ("tare weight") can be expressed as:

$$P1_{TARE}=m1*S1_{TARE}+b1 \quad (9)$$

and $$P2_{TARE}=m2*S2_{TARE}+b2 \quad (10)$$

Likewise, when the vehicle is carrying a load, the forces due to the combination of the load and the tare weight are:

$$P1_{GROSS} = m1 * S1_{GROSS} + b1 \quad (11)$$

and $$P2_{GROSS} = m2 * S2_{GROSS} + b2 \quad (12)$$

Subtracting the respective tare weight forces from the forces asserted when carrying a load yields the forces asserted solely by the load. That is:

$$P1_{LOAD} = m1 * S1_{LOAD} \quad (13)$$

and $$P2_{LOAD} = m2 * S2_{LOAD} \quad (14)$$

where $S1_{LOAD}$ and $S2_{LOAD}$ represent the portion of the respective sensor signals attributable only to the load being carried.

Substituting equation (4) into equation (13) results in the following expression for the value of m1:

$$m1 = \frac{A1_{LOAD}\left(\frac{L3}{L5}\right) + A2_{LOAD}\left(\frac{L6}{L5}\right)}{S1_{LOAD}} \quad (15)$$

or:

$$m1 = \frac{(A1_{TOTAL} - A1_{TARE})\left(\frac{L3}{L5}\right) + (A2_{TOTAL} - A2_{TARE})\left(\frac{L6}{L5}\right)}{S1_{LOAD} - S1_{TARE}} \quad (16)$$

Substituting the value for P1 from equation (4) into equation (9), yields the following expression for the constant b1:

$$b1 = A1_{TARE}\left(\frac{L3}{L5}\right) + A2_{TARE}\left(\frac{L6}{L5}\right) - (m1 * S1_{TARE}) \quad (17)$$

Similar calculations lead to the following expression for constants m2 and b2:

$$m2 = \frac{(A2_{FULL} - A2_{TARE})\left(\frac{L4}{L5}\right) - (A1_{FULL} - A1_{TARE})\left(\frac{L1}{L5}\right)}{S2_{FULL} - S2_{TARE}} \quad (18)$$

$$b2 = A2_{TARE}\left(\frac{L4}{L5}\right) - A1_{TARE}\left(\frac{L1}{L5}\right) - (m2 * S2_{TARE}) \quad (19)$$

Note that, in the alternative configuration that corresponds to equations (3) and (6), equations (18) and (19) would differ in that the A1 component would be added to rather than subtracted from the A2 component.

In the practice of the invention, the constants m1, m2, b1 and b2 are determined by what is commonly called a two-point calibration procedure. Specifically, $A1_{TARE}$ and $A2_{TARE}$ are determined by measuring the weight on the forward axle assembly and rear wheel axle system with a platform scale with the vehicle unloaded. The vehicle is then loaded, preferably to full weight carrying capacity and the weight borne by each axle is determined with the platform scale to determine the values $A1_{FULL}$ and $A2_{FULL}$. The sensor readings $S1_{TARE}$, $S2_{TARE}$, $S1_{FULL}$, and $S2_{FULL}$ are recorded both with the vehicle unloaded and when fully loaded. Since the distances L1, L2, L3, L4, L5, and L6 are determined by the vehicle sensor geometry, each quantity is known. Thus, each physical quantity required for a determination of m1, m2, b1, and b2 is available. Accordingly, the tare weight forces $P1_{TARE}$ and $P2_{TARE}$ can be determined in accordance with equations (9) and (10) and the gross weight forces $P1_{GROSS}$ and $P2_{GROSS}$ can be determined in accordance with equations (11) and (12). Load weight forces are likewise available, being the difference between the respective gross weight force and tare weight force. With the gross weight and the tare weight values of P1 and P2 available, the axle assembly weights can be determined; specifically, substituting equations (7) and (8) in equation (1) yields:

$$A1 = \frac{L4(m1 * S1 + b1) - L6(m2 * S2 + b2)}{L2} \quad (20)$$

for the weight borne by the rear axle system. Substituting equations (7) and (8) in equation (2) yields:

$$A2 = \frac{L1(m1 * S1 + b1) - L3(m2 * S2 + b2)}{L2} \quad (21)$$

for the weight borne by the front axle assembly.
Alternatively, A1 and A2 can be expressed as:

$$A1 = c1 * S1 - c2 * S2 + c3 \quad (22)$$

and, $$A2 = c4 * S1 + c5 * S2 + c6 \quad (23)$$

where, $$c1 = \frac{L4 * m1}{L2} \quad (24)$$

$$c2 = \frac{L6 * m2}{L2} \quad (25)$$

$$c3 = \frac{L4 * b1 - L6 * b2}{L2} \quad (26)$$

$$c4 = \frac{L1 * m1}{L2} \quad (27)$$

$$c5 = \frac{L3 * m2}{L2} \quad (28)$$

and $$c6 = \frac{L1 * b1 + L3 * b2}{L2} \quad (29)$$

Once the system is calibrated by determining m1, m2, b1, and b2, the axle assembly weights A1 and A2 will accurately reflect the load of the vehicle and its load that are carried by each axle assembly throughout the entire vehicle load range. Moreover, the net weight of the payload at each axle assembly can be determined by subtracting the respective tare values from the associated current gross axle weight value, that is, $$A1_{LOAD} = A1_{GROSS} - A1_{TARE} \quad (30)$$

$$A2_{LOAD} = A2_{GROSS} - A2_{TARE} \quad (31)$$

The preferred embodiments of the invention include an onboard computer for used in calibration and for processing the S1 and S2 signals and visually displaying weight information to the vehicle operator. As is shown in FIG. 1, the onboard computer includes a data processor 140, computer memory 142, a keypad 144 means of inputting information, and a numeric display 146 or other means of displaying results.

In this arrangement, the sensor signals are supplied to the data processor 140 via suitable cabling and the data processor 140 responds to signals generated by means of keypad 144 causing numeric display 146 to indicate axle weights or other information used in calibrating and operating the system. Memory 142 stores program instructions for system operation and, in addition, the system dimensional quantities L1, L2, L3, L4, L5, and L6, which need only be supplied to memory when the system is initially installed. As previously mentioned, L4, L5, and L6 can be determined based upon the values of L1, L2, and L3. Thus, in some arrangements of the invention only L1, L2 and L3 need be stored in memory 142. Obviously, other combinations of three or more from the set of quantities L1, L2, L3, L4, L5, and L6 exist such that, by storing the combination, the remaining quantities can be calculated.

During the calibration procedure, the operator uses keypad 144 to enter $A1_{TARE}$ and $A2_{TARE}$ (the rear and front axle assembly weights) when the vehicle is unloaded and each axle weight is determined with a platform scale or other conventional device. A full load is then placed on the vehicle. The axle weights are again determined; and values for $A1_{FULL}$ and $A2_{FULL}$ are entered via keypad 144. The onboard computer then calculates m1, m2, b1, and b2. Preferably, for ease of subsequent computer computation, the constants c1, c2, c3, c4, c5, and c6 are determined and stored in memory 142 after system calibration to allow gross axle weight determinations that are based upon equations (22) and (23). As previously mentioned, net or payload weights can then be determined by subtracting axle assembly tare weight from the associated gross axle weight.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for determining the axle weights of a vehicle of the type having a first and second longitudinally spaced apart axle assemblies, a frame, and a load bed, the reel comprising:

(a) providing a plurality of weight sensors for supplying signals, wherein at least one weight sensor is longitudinally spaced apart from the axle assemblies, each signal being representative of a weight exerted at the location of the sensor;

(b) processing the signals supplied by said weight sensors to determine the weight exerted on the first axle assembly, based upon an equilibrium of moments about the first axle assembly, at the weight sensors and the second axle system.

2. The method of claim 1, wherein at least two weight sensors longitudinally spaced apart from the axle assemblies, and longitudinally spaced apart from each other.

3. The method of claim 2, wherein at least one weight sensor is longitudinally intermediate the first axle assembly and the second axle assembly, and one of said axle assemblies is longitudinally intermediate two of said weight sensors.

4. The method of claim 3, wherein the determination of the weight on the first axle assembly is in accordance with $$\frac{(P1*L4)-(P2*L6)}{L2},$$

wherein:

L2 represents the longitudinal distance between the first axle assembly and the second axle assembly;

P1 represents the force exerted upon a first set of weight sensors;

L4 represents the longitudinal distance between the first set of weight sensors and the second axle assembly;

P2 represents the force exerted upon a second set of weight sensors; and

L6 represents the longitudinal distance between the second axle assembly and the second set of weight sensors; and wherein the second axle assembly is longitudinally positioned between the first set of weight sensors and the second set of weight sensors.

5. The method of claim 4, additionally comprising determining a calibration value that represents a linear relationship between a signal corresponding to a first weight sensor and a vertical force at said first weight sensor, said determination based upon an equilibrium of moments about a second weight sensor at the axle assemblies and at the first weight sensor.

6. The method of claim 5, wherein the determination of said calibration value additionally comprises:

(a) determining a first weight on each of the axle assemblies, with a first load supported by the vehicle;

(b) determining a second weight on each of the axle assemblies, with a second load supported by the vehicle; and (c) processing signals supplied by said weight sensors, with said first load supported by the vehicle and with said second load supported by the vehicle.

7. The method of claim 1, further comprising providing a data processor electronically connected to said weight sensors.

8. A vehicle onboard weight-measuring system for determining axle weights of a vehicle of the type having first and second longitudinally spaced-apart axle assemblies, a frame, and a load bed, the system comprising:

(a) a plurality of weight sensors for supplying signals, each signal being representative of a weight exerted at the location of the sensor, the weight sensors being longitudinally spaced apart from the axle assemblies; and (b) a microprocessor electronically connected to the weight sensors, the microprocessor producing an output signal indicative of the load carried by a first axle assembly of the vehicle, said output signal based upon an equilibrium of moments about the first axle assembly, at the weight sensors and a second axle assembly.

9. The system of claim 8, wherein at least one weight sensor is located intermediate the first axle assembly and the second axle assembly, and one axle assembly is located longitudinally intermediate a first weight sensor and a second weight sensor.

10. A method for determining the axle weights of a vehicle of the type having a first and a second longitudinally spaced apart axle assemblies, a frame, and a load bed, the method comprising:

(a) providing a plurality of weight sensors longitudinally spaced apart from axle assemblies for supplying signals, each signal being representative of a weight exerted at location of the sensor, wherein at least one weight sensor is longitudinally intermediate the first axle assembly and the second axle assembly, and one of the axle assemblies is longitudinally intermediate two of the weight sensors; and (b) processing the signal supplied by said weight sensors to determine the weight exerted on the first axle assembly, based upon equilibrium of moments about the first axle assembly, at the weight sensors and the second axle system.

11. The method of claim 10, wherein the determination of the weight on the first axle assembly is in accordance with $$\frac{(P1*L4)-(P2*L6)}{L2},$$

wherein:

L2 represents the longitudinal distance between the first axle assembly and the second axle assembly;

P1 represents the force exerted upon a first weight sensor;

L4 represents the longitudinal distance between the first weight sensor and the second axle assembly;

P2 represents the force exerted upon a second weight sensor;

L6 represents the longitudinal distance between the second axle assembly and the second weight sensor; and wherein the second axle assembly is longitudinally positioned between the first weight sensor and the second weight sensor.

12. The method of claim 11, additionally comprising determining a calibration value that represents a linear relationship between a signal corresponding to the first weight sensor and a vertical force at the first weight sensor, said determination based upon an equilibrium of moments about the second weight sensor at each of the axle assemblies and at the first weight sensor.

13. The method of claim 12, wherein said determination of the calibration value additionally comprises:

(a) determining a first weight on each of the axle assemblies, with a first load supported by the vehicle;

(b) determining a second weight on each of the axle assemblies, with a second load supported by the vehicle; and (c) processing signals supplied by the weight sensors, with the first load supported by the vehicle and with the second load supported by the vehicle.

14. The method of claim 10, further comprising:

(a) providing a plurality of sets of weight sensors longitudinally spaced apart from the axle assemblies for supplying signals, each set of weight sensors comprising at least one weight sensor, at least one set of weight sensors comprising at least two weight sensors, each signal being representative of a weight exerted at the location of the sensor corresponding to the signal, wherein at least one set of weight sensors is longitudinally intermediate the first axle assembly and the second axle assembly, and at least one axle assembly is longitudinally intermediate two sets of weight sensors.

15. The method of claim 14, wherein the determination of the weight on the first axle assembly is in accordance with $$\frac{(P1*L4)-(P2*L6)}{L2},$$

wherein:

L2 represents the longitudinal distance between the first axle assembly and the second axle assembly;

P1 represents the force exerted upon a first set of weight sensors;

L4 represents the longitudinal distance between the first set of weight sensors and the second axle assembly;

P2 represents the force exerted upon a second set of weight sensors;

L6 represents the longitudinal distance between the second axle assembly and the second set of weight sensors; and wherein the second axle assembly is longitudinally positioned between the first set of weight sensors and the second set of weight sensors.

16. A vehicle onboard weight-measuring system for determining axle weights of a vehicle of the type having first and second longitudinally spaced-apart axle assemblies, a frame, and a bed, the system comprising:

(a) a plurality of weight sensors for supplying signals, each signal being representative of a weight exerted at the location of the sensor, the weight sensors being longitudinally spaced apart from the axle assemblies and including at least one weight sensor located intermediate the first axle assembly and the second axle assembly, wherein one axle assembly is located longitudinally intermediate a first weight sensor and a second weight sensor; and (b) a microprocessor electronically connected to the weight sensors, microprocessor producing an output signal indicative of the load carried by the first axle assembly of the vehicle, said output signal based upon an equilibrium of moments about the first axle assembly, at the weight sensors and at the second axle assembly.

* * * * *

UNITED STATES PATENT AND TRADEMARK OFFICE
CERTIFICATE OF CORRECTION

PATENT NO. : 5,677,498
DATED : October 14, 1997
INVENTOR(S) : B.R. Oakes et al.

It is certified that error appears in the above-indentified patent and that said Letters Patent is hereby corrected as shown below:

| COLUMN | LINE | | |
|---|---|---|---|
| 9 (Claim 1, | 33 line 3) | "reel" should read --method-- | |
| 9 (Claim 2, | 45 line 2) | after "sensors" insert --are-- | |
| 10 (Claim 10, | 54 line 6) | after "from" insert --the-- | |
| 10 (Claim 10, | 56 line 8) | after "exerted at" insert --the-- | |
| 12 (Claim 16, | 28 line 4) | after "and a" insert --load-- | |
| 12 (Claim 16, | 39 line 15) | after "sensors," insert --the-- | |

Signed and Sealed this

Twelfth Day of May, 1998

Attest:

BRUCE LEHMAN

Attesting Officer

Commissioner of Patents and Trademarks